C. D. LINDSEY.
PAPER FILE-FASTENER.
No. 172,753.                        Patented Jan. 25, 1876.
Fig. 1.  Fig. 2.              Fig. 3.  Fig. 4.
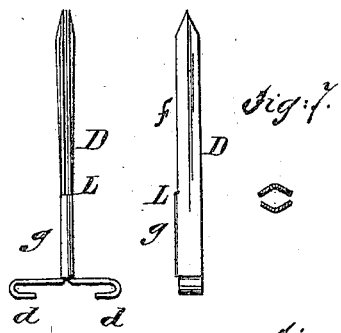
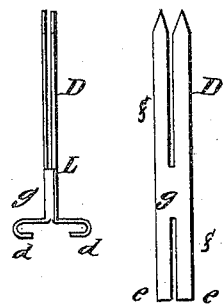
Fig. 5.  Fig. 6.
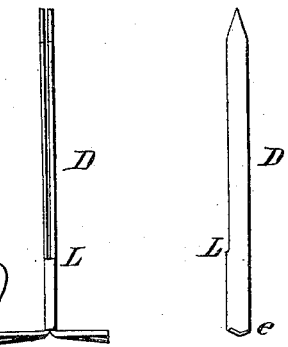
WITNESSES:
INVENTOR:
C. D. Lindsey
BY
ATTORNEYS.

UNITED STATES PATENT OFFICE.

CHARLES D. LINDSEY, OF CINCINNATI, OHIO.

IMPROVEMENT IN PAPER-FILE FASTENERS.

Specification forming part of Letters Patent No. 172,753, dated January 25, 1876; application filed February 20, 1875.

*To all whom it may concern:*

Be it known that I, CHARLES D. LINDSEY, of Cincinnati, in the county of Hamilton and State of Ohio, have invented a new and useful Improvement in Paper-File Fasteners, of which the following is a specification:

The invention will first be described in connection with drawing, and then pointed out in the claim.

In the drawings, Figures 1, 3, 5 are front, and Fig. 2, 4, 6 side elevations, while Fig. 7 is a horizontal section.

D represents the fastener, having its sides brought to a point at the upper end, and made of a single piece of metal, cut as shown in Fig. 4 of drawing, and folded, as shown in Fig. 3.

It will be perceived that the ends $e\ e$ are brought into the form of hooks $d\ d$, the sides $f f$ made to assume the angular form shown in Fig. 7, or made with a bend, $g$, simply. The sides $f f$ are also cut away to form a shoulder, L, so as to leave the whole portion $g$ broader and stronger.

What I claim as new is—

A one-piece metallic paper-file, having hooks $d\ d$, sides $f f$, and shoulder L, as shown and described.

CHARLES D. LINDSEY.

Witnesses:
 FRINK W. MEUCHUN,
 E. B. BALDIN.